United States Patent
Amit et al.

(10) Patent No.: US 8,788,713 B2
(45) Date of Patent: *Jul. 22, 2014

(54) COMPRESSION BLOCK INPUT/OUTPUT REDUCTION

(71) Applicant: International Business Machines Corporation, Armonk, NY (US)

(72) Inventors: Jonathan Amit, Yehud (IL); Chaim Koifman, Yehud (IL); Sergey Marenkov, Yehud (IL); Ori Shalev, Yehud (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/789,227

(22) Filed: Mar. 7, 2013

(65) Prior Publication Data

US 2013/0185458 A1 Jul. 18, 2013

Related U.S. Application Data

(63) Continuation of application No. 13/345,301, filed on Jan. 6, 2012.

(51) Int. Cl.
  *G06F 15/16* (2006.01)
  *G06F 3/00* (2006.01)
  *G06F 13/28* (2006.01)

(52) U.S. Cl.
  USPC .................................. 709/247; 710/5; 710/30

(58) Field of Classification Search
  USPC .......................................... 710/5, 30; 709/247
  See application file for complete search history.

(56) References Cited

U.S. PATENT DOCUMENTS

| 5,394,534 A * | 2/1995 | Kulakowski et al. | 711/112 |
| 5,784,699 A * | 7/1998 | McMahon et al. | 711/171 |
| 5,956,504 A | 9/1999 | Jagadish et al. | |
| 6,539,464 B1 * | 3/2003 | Getov | 711/170 |
| 7,496,586 B1 | 2/2009 | Bonwick et al. | |
| 2002/0057844 A1 * | 5/2002 | Sirohey et al. | 382/240 |
| 2010/0318684 A1 | 12/2010 | Fallon | |

FOREIGN PATENT DOCUMENTS

AU  WO208138042 A1  11/2008

OTHER PUBLICATIONS

Seung Hyun Nam and Moon Key Lee, High Throughput Block Matching VLSI Architecture with Low Memory Bandwidth, IEEE Transactions on Circuits and Systems—II. Analog and Digital Signal Processing, vol. 45, No. 4, Apr. 1998, 5 pages.

Thanos Makatos, Yannis Klonatos, Manolis Marazakis, Michail D. Flouris, and Angelos Bilas, ZBD: Using Transparent Compression at the Block Level to Increase Storage Space Efficiency, 2010, 27 pages.

* cited by examiner

*Primary Examiner* — Farley Abad
(74) *Attorney, Agent, or Firm* — Griffiths & Seaton PLLC

(57) ABSTRACT

Exemplary method, system, and computer program product embodiments compression blocks input/output (I/O) reduction are provided. In one embodiment, by way of example only, data blocks are arranged into groups to provide a single I/O. Lists indicating the available block space for the data blocks are organized in advance according to space size. The data blocks required for a single command are allocated as the single I/O. The data blocks are sequentially ordered. Additional system and computer program product embodiments are disclosed and provide related advantages.

8 Claims, 6 Drawing Sheets

COMPRESSION BLOCK INPUT/OUTPUT REDUCTION

CROSS REFERENCE TO RELATED APPLICATIONS

This application is a Continuation of U.S. patent application Ser. No. 13/345,301, filed on Jan. 6, 2012.

FIELD OF THE INVENTION

The present invention relates generally to computers, and more particularly, to compression blocks input/output (I/O) reduction in a computing environment.

DESCRIPTION OF THE RELATED ART

In today's society, computer systems are commonplace. Computer systems may be found in the workplace, at home, or at school. Computer systems may include data storage systems, or disk storage systems, to process and store data. In recent years, both software and hardware technologies have experienced amazing advancement. With the new technology, more and more functions are added and greater convenience is provided for use with these electronic appliances. One of the most noticeable changes introduced by recent computer technology is the inclusion of images, video, and audio to enhance the capabilities of computers and electronic appliances. Iii the age of multimedia, the amount of information to be processed increases greatly. One popular method of handling large data files is to compress the data for storage or transmission. Data compression is widely used to reduce the amount of data required to process, transmit, or store a given quantity of information. Compression can be used, for example, to reduce the storage requirements for files, to increase the communication rate over a channel, or to reduce redundancy prior to encryption for greater security.

SUMMARY OF THE DESCRIBED EMBODIMENTS

With increasing demand for faster, more powerful and more efficient ways to store and retrieve information, optimization of storage technologies is becoming a key challenge. Logical data objects (data files, image files, data blocks, etc.) may be compressed for transmission and/or storage. Disk compression provides for the compression of individual files or directories to be stored on a hard disk. Disk compression enables data to be accessed randomly by dividing logical unit into small blocks. Each block starts with new dictionary to enable decompressing of the data block independently and random access to the data.

However, when the data size of a write command is larger than the size of the compressed block, the write command will cause a write operation on multiple blocks. The multiple blocks may generate much more Input/Output (I/O) on the disk than requested by the user. It is possible to increase the size of the compressed block to a maximum size of the write operation. However, this solution will cause large compression blocks, which have a negative effect on random access, memory and performance. Thus, a need exists to combine multiple compressed blocks and allocate continuous blocks required for a single command and write them as one I/O.

Accordingly, and in view of the foregoing, various exemplary method, system, and computer program product embodiments for compression blocks input/output (I/O) reduction operations are provided. In one embodiment, by way of example only, data blocks are arranged into groups to provide a single I/O. Lists indicating the available block space for the data blocks are organized in advance according to space size. The data blocks required for a single command are allocated as the single I/O. The data blocks are sequentially ordered. Additional system and computer program product embodiments are disclosed and provide related advantages.

The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF CERTAIN EMBODIMENTS

As mentioned previously, with increasing demand for faster, more powerful and more efficient ways to store information, optimization of storage technologies is becoming a key challenge. With increasing demand for faster, more powerful and more efficient ways to store and retrieve information, optimization of storage technologies is becoming a key challenge. Logical data objects (data files, image files, data blocks, etc.) may be compressed for transmission and/or storage. Disk compression provides for the compression of individual files or directories to be stored on a hard disk. Disk compression enables data to be accessed randomly by dividing logical unit into small blocks. Each block starts with a new dictionary to enable decompressing of the data block independently and random access to the data. The dictionary may contain various pieces of information to enable decompressing the data blocks independently and for random access to the data.

However, when the data size of a write command is larger than the size of the compressed block, the write command will cause a write operation on multiple blocks. The multiple blocks may generate much more Input/Output (I/O) on the disk than requested by the user. For example, the compressed block size may be 64K (Kilobytes) and the data of the write command may be 1 MB (Megabyte). The data will compress 320K and will require 5 compressed blocks. Each block will be written with a separate command causing 5 times the amount of the original I/O requests.

It is possible to increase the size of the compressed block to a maximum size of the write operation. However, this solution will cause large compression blocks, which have a negative effect on random access, memory and performance. Thus, a need exists to combine multiple compressed blocks and allocate continuous blocks required for a single command and write them as one I/O.

In contrast, and to address the inefficiencies previously described, the mechanisms of the illustrated embodiments serve to create a solution for writing multiple compressed blocks required for a single command as only one I/O. Previously, it was impossible to write multiple blocks in a single I/O due to the fact that they were not ordered sequentially. To accomplish these objectives, in one embodiment, the mechanisms arrange the compressed data blocks into groups to provide a single I/O. Lists indicating the available block space for the data blocks are organized in advance according to space size. The data blocks required for a single command are allocated as the single I/O. The data blocks are sequentially ordered. Blocks may reside on different location on the logical unit due to the fact they are reused.

Figure 1:
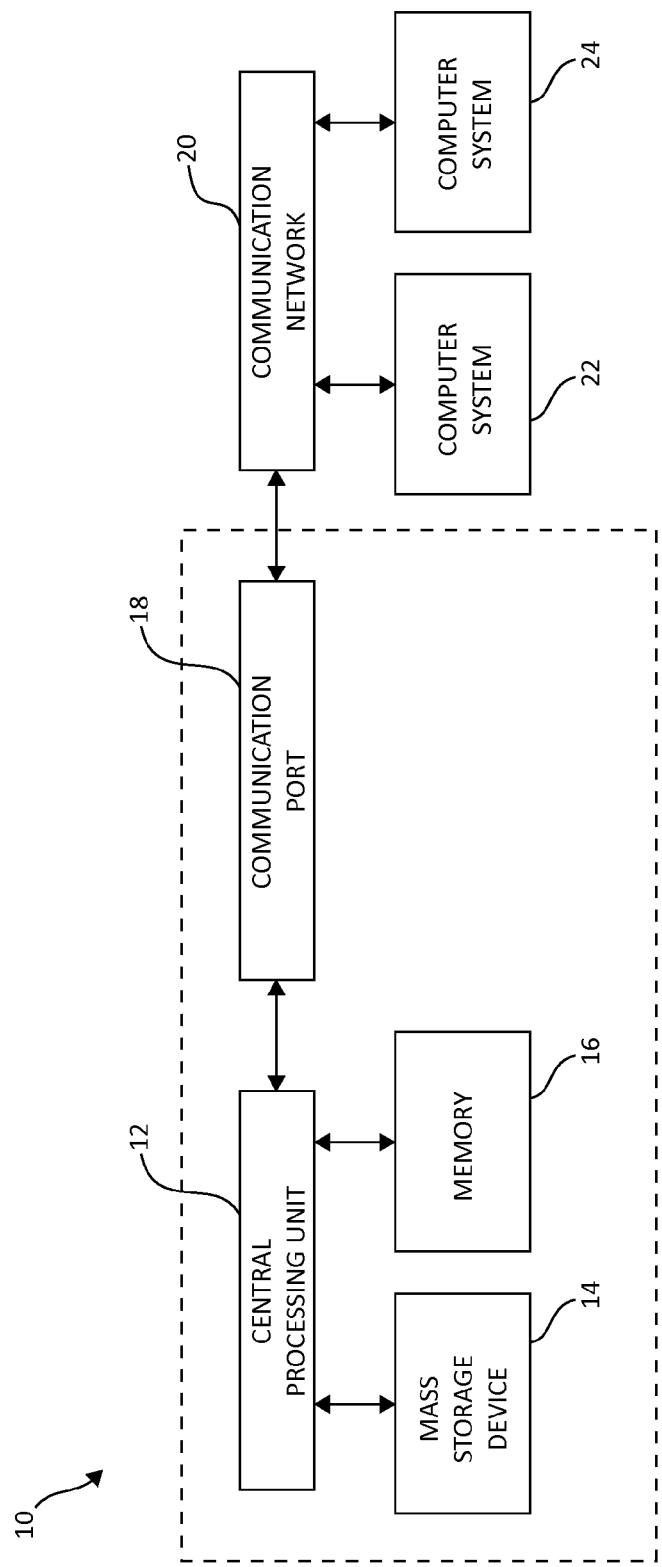
FIG. 1 illustrates a computer storage environment having an example storage device in which aspects of the present invention may be realized.

Turning to FIG. 1, an example computer system 10 is depicted in which aspects of the present invention may be realized. Computer system 10 includes central processing unit (CPU) 12, which is connected to mass storage device(s) 14 and memory device 16. Mass storage devices may include hard disk drive (HDD) devices, which may be configured in a redundant array of independent disks (RAID). Memory device 16 may include such memory as electrically erasable programmable read only memory (EEPROM) or a host of related devices. Memory device 16 and mass storage device 14 are connected to CPU 12 via a signal-bearing medium. In addition, CPU 12 is connected through communication port 18 to a communication network 20, having an attached plurality of additional computer systems 22 and 24. The computer system 10 may include one or more processor devices (e.g., CPU 12) and additional memory devices 16 for each individual component of the computer system 10.

Figure 2:
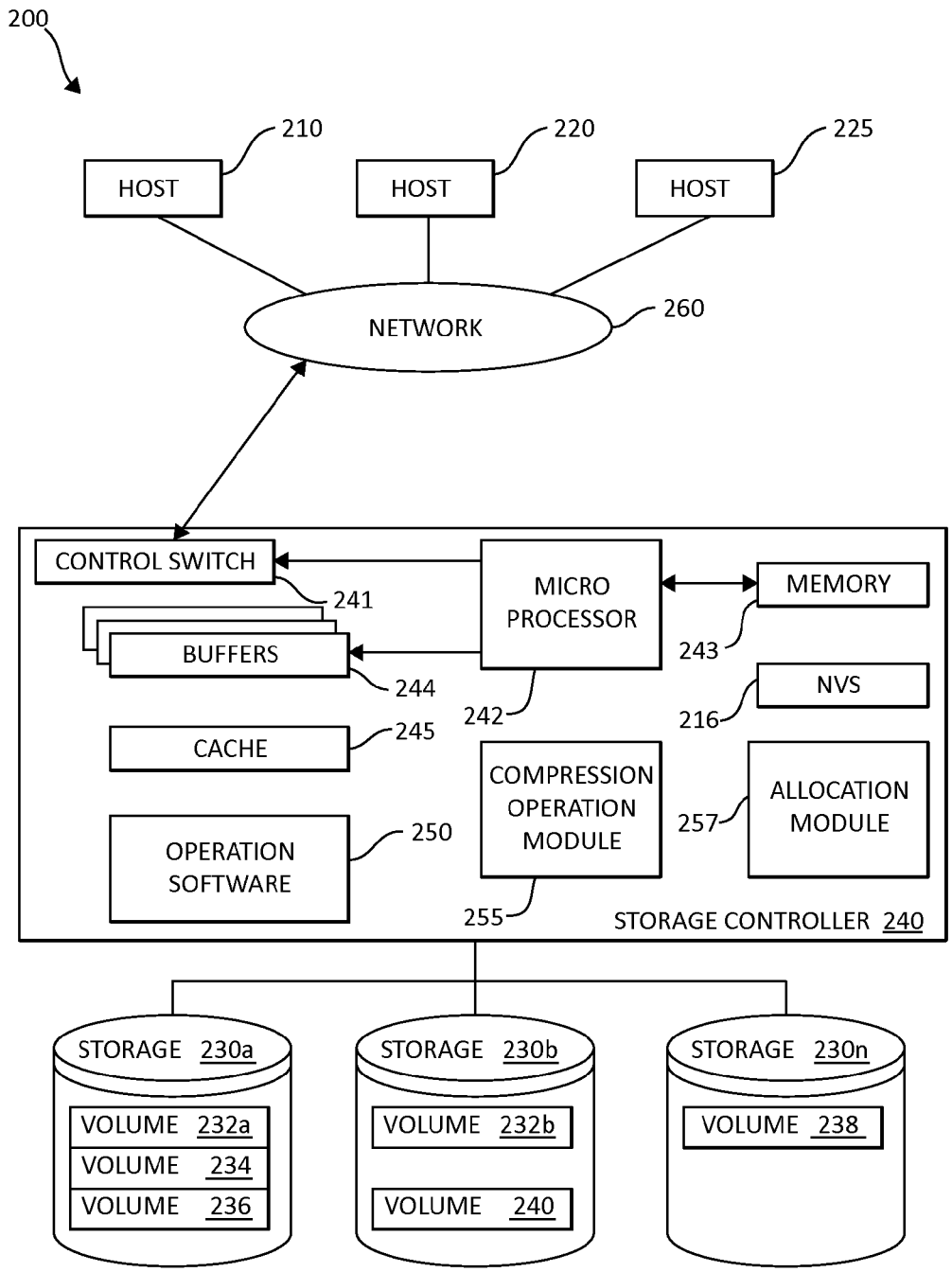
FIG. 2 illustrates an exemplary block diagram showing a hardware structure of a data storage system in a computer system in which aspects of the present invention may be realized.

FIG. 2 is an exemplary block diagram 200 showing a hardware structure of a data storage system in a computer system according to the present invention. Host computers 210, 220, 225, are shown, each acting as a central processing unit for performing data processing as part of a data storage system 200. The hosts (physical or virtual devices), 210, 220, and 225 may be one or more new physical devices or logical devices to accomplish the purposes of the present invention in the data storage system 200. In one embodiment, by way of example only, a data storage system 200 may be implemented as IBM® System Storage™ DS8000™. A Network connection 260 may be a fibre channel fabric, a fibre channel point to point link, a fibre channel over ethernet fabric or point to point link, a FICON or ESCON I/O interface, any other I/O interface type, a wireless network, a wired network, a LAN, a WAN, heterogeneous, homogeneous, public (i.e. the Internet), private, or any combination thereof. The hosts, 210, 220, and 225 may be local or distributed among one or more locations and may be equipped with any type of fabric (or fabric channel) (not shown in FIG. 2) or network adapter 260 to the storage controller 240, such as Fibre channel, FICON, ESCON, Ethernet, fiber optic, wireless, or coaxial adapters. Data storage system 200 is accordingly equipped with a suitable fabric (not shown in FIG. 2) or network adapter 260 to communicate. Data storage system 200 is depicted in FIG. 2 comprising storage controller 240 and storage 230.

To facilitate a clearer understanding of the methods described herein, storage controller 240 is shown in FIG. 2 as a single processing unit, including a microprocessor 242, system memory 243 and nonvolatile storage ("NVS") 216, which will be described in more detail below. It is noted that in some embodiments, storage controller 240 is comprised of multiple processing units, each with their own processor complex and system memory, and interconnected by a dedicated network within data storage system 200. Storage 230 may be comprised of one or more storage devices, such as storage arrays, which are connected to storage controller 240 by a storage network.

In some embodiments, the devices included in storage 230 may be connected in a loop architecture. Storage controller 240 manages storage 230 and facilitates the processing of write and read requests intended for storage 230. The system memory 243 of storage controller 240 stores program instructions and data, which the processor 242 may access for executing functions and method steps of the present invention for executing and managing storage 230 as described herein. In one embodiment, system memory 243 includes, is in association with, or is in communication with the operation software 250 for performing methods and operations described herein. As shown in FIG. 2, system memory 243 may also include or be in communication with a cache 245 for storage 230, also referred to herein as a "cache memory", for buffering "write data" and "read data", which respectively refer to write/read requests and their associated data. In one embodiment, cache 245 is allocated in a device external to system memory 243, yet remains accessible by microprocessor 242 and may serve to provide additional security against data loss, in addition to carrying out the operations as described in herein.

In some embodiments, cache 245 is implemented with a volatile memory and nonvolatile memory and coupled to microprocessor 242 via a local bus (not shown in FIG. 2) for enhanced performance of data storage system 200. The NVS 216 included in data storage controller is accessible by microprocessor 242 and serves to provide additional support for operations and execution of the present invention as described in other figures. The NVS 216, may also referred to as a "persistent" cache, or "cache memory" and is implemented with nonvolatile memory that may or may not utilize external power to retain data stored therein. The NVS may be stored in and with the cache 245 for any purposes suited to accomplish the objectives of the present invention. In some embodiments, a backup power source (not shown in FIG. 2), such as a battery, supplies NVS 216 with sufficient power to retain the data stored therein in case of power loss to data storage system 200. In certain embodiments, the capacity of NVS 216 is less than or equal to the total capacity of cache 245.

Storage 230 may be physically comprised of one or more storage devices, such as storage arrays. A storage array is a logical grouping of individual storage devices, such as a hard disk. In certain embodiments, storage 230 is comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a write/read request.

In one embodiment, by way of example only, the storage system as shown in FIG. 2 may include a logical volume, or simply "volume," may have different kinds of allocations. Storage 230a, 230b and 230n are shown as ranks in data storage system 200, and are referred to herein as rank 230a, 230b and 230n. Ranks may be local to data storage system 200, or may be located at a physically remote location. In other words, a local storage controller may connect with a remote storage controller and manage storage at the remote location. Rank 230a is shown configured with two entire volumes, 234 and 236, as well as one partial volume 232a. Rank 230b is shown with another partial volume 232b. Thus volume 232 is allocated across ranks 230a and 230b. Rank 230n is shown as being fully allocated to volume 238—that is, rank 230n refers to the entire physical storage for volume 238. From the above examples, it will be appreciated that a rank may be configured to include one or more partial and/or entire volumes. Volumes and ranks may further be divided into so-called "tracks," which represent a fixed block of storage. A track is therefore associated with a given volume and may be given a given rank.

The storage controller 240 may include a compression operation module 255 and allocation module 257. The compression operation module 255 and allocation module 257 may work in conjunction with each and every component of the storage controller 240, the hosts 210, 220, 225, and storage devices 230. Both the compression operation module 255 and allocation module 257 may be structurally one complete module or may be associated and/or included with other individual modules. The compression operation module 255 and allocation module 257 may also be located in the cache 245 or other components.

The storage controller 240 includes a control switch 241 for controlling the fiber channel protocol to the host computers 210, 220, 225, a microprocessor 242 for controlling all the storage controller 240, a nonvolatile control memory 243 for storing a microprogram (operation software) 250 for controlling the operation of storage controller 240, data for control and each table described later, cache 245 for temporarily storing (buffering) data, and buffers 244 for assisting the cache 245 to read and write data, a control switch 241 for controlling a protocol to control data transfer to or from the storage devices 230, and compression operation module 255 and allocation module 257 in which information may be set. Multiple buffers 244 may be implemented with the present invention to assist with the operations as described herein.

In one embodiment, the host computers or one or more physical or virtual devices, 210, 220, 225 and the storage controller 240 are connected through a network adaptor (this could be a fibre channel) 260 as an interface i.e., via a switch called "fabric." In one embodiment, the operation of the system shown in FIG. 2 will be described. The microprocessor 242 may control the memory 243 to store command information from the host device (physical or virtual) 210 and information for identifying the host device (physical or virtual) 210. The control switch 241, the buffers 244, the cache 245, the operating software 250, the microprocessor 242, memory 243, NVS 216, compression operation module 255 and allocation module 257 are in communication with each other and may be separate or one individual component(s). Also, several, if not all of the components, such as the operation software 250 may be included with the memory 243. Each of the components within the devices shown may be linked together and may be in communication with each other for purposes suited to the present invention.

Figure 3:
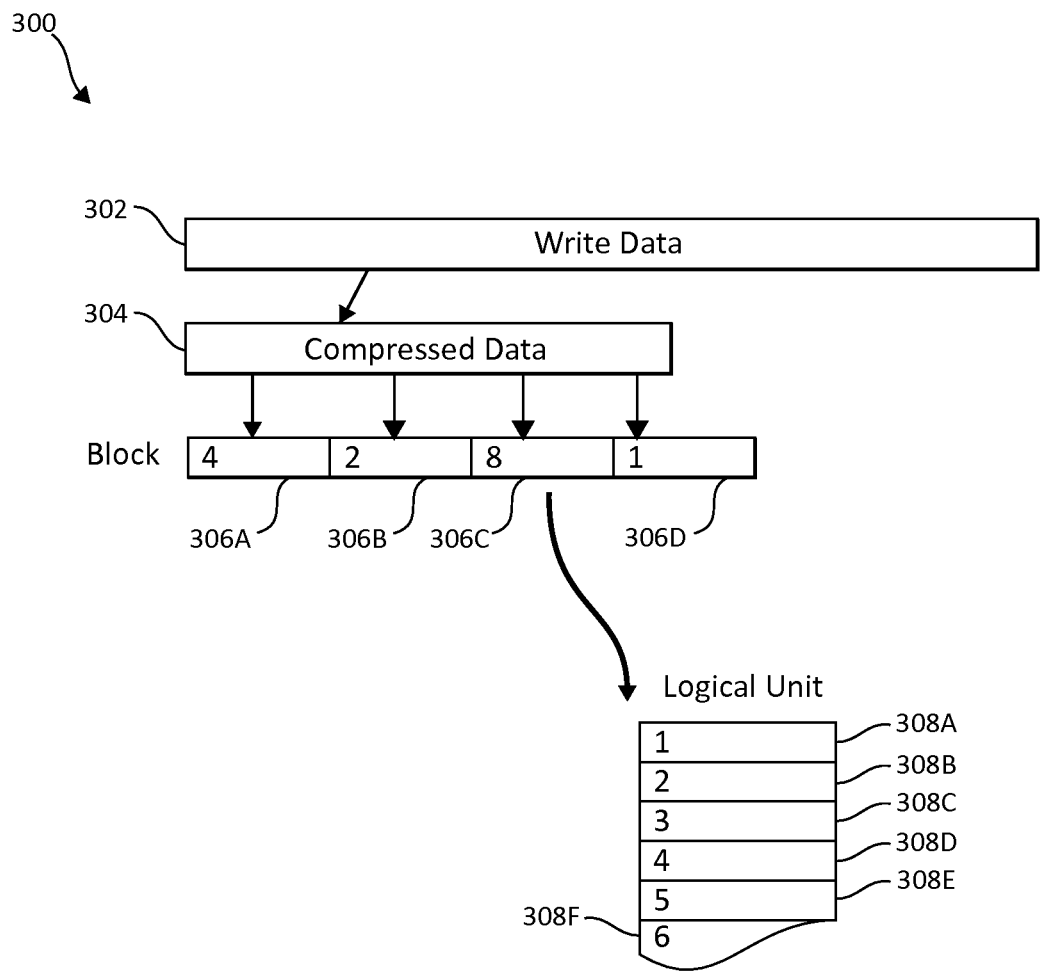
FIG. 3 illustrates an exemplary block diagram for data compression by dividing data blocks into logical units.

FIG. 3 illustrates an exemplary block diagram for data compression by dividing data blocks into logical units. A write command 302 (e.g., a data write command) is issued. The data is compressed. However, the compressed data 302 is individually compressed to multiple data blocks 306 (illustrated as 306A-C). Each one of the multiple blocks 306 (e.g., 306C) may be associated with logical units, with the logical units divided into small blocks 308 (illustrated as 308A-F).

Figure 4:
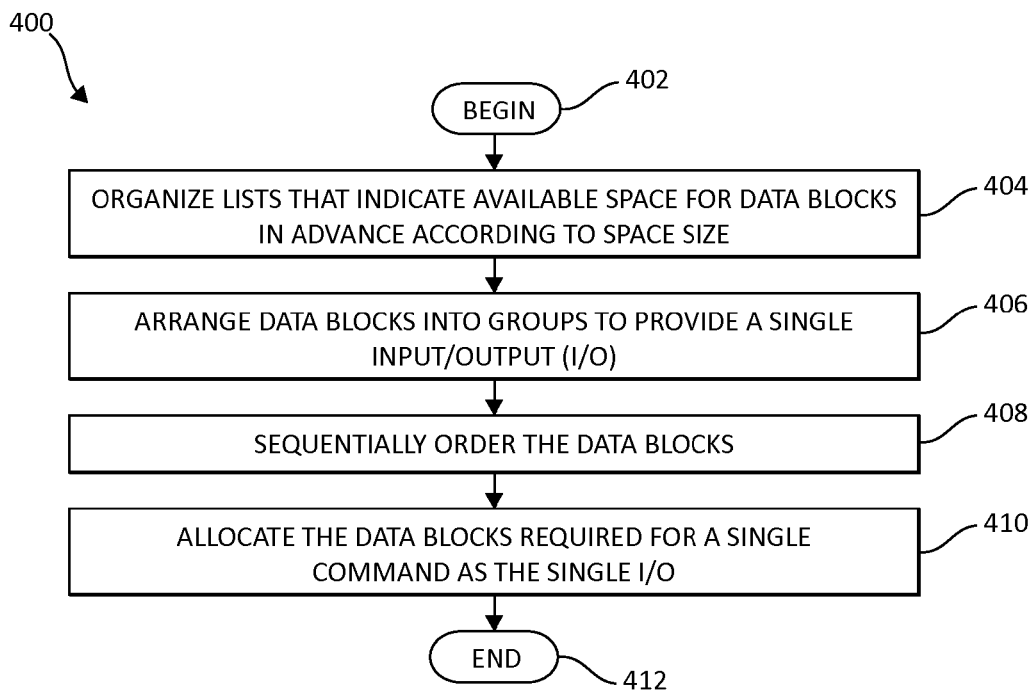
FIG. 4 is a flowchart illustrating an exemplary method for allocating data blocks required for a single command as a single Input/Output (I/O)

Turning to FIG. 4, a flowchart illustrating an exemplary method 400 for allocating data blocks required for a single command as a single Input/Output (I/O) is depicted. The method 400 begins (step 402). The method 400 may organize lists that indicate available space for data blocks in advance according to space size (step 404). Data blocks are arranged into groups to provide a singe Input/Output (I/O) (step 406). The data blocks are sequentially ordered (step 408). The data blocks required for a single command are allocated as a single I/O (step 410). The method 400 ends (step 412).

In an alternative embodiment, data blocks relating to a write command may be sequentially allocated. The blocks are then compressed independently. A single write IO may be issued to storage containing the contents of each of the data blocks. Despite the relatively small size of the data blocks, the data blocks may be randomly accessed due to that fact each data block has a new compression dictionary. Alternatively, if a read operation is executed, the mechanisms may use large read commands and may fetch all of the corresponding compressed blocks as one read request.

In one embodiment, a new block allocation operation (e.g., algorithm) uses multiple lists for each group of free block numbers. For example, a group of 4 sequential free blocks will be kept in a list for "4 sequential blocks". When a block is freed, the lists are correspondingly updated by examining the new status of the free blocks around that block. When a group of block allocation is requested, the algorithm tries to allocate the required number of sequential blocks from the corresponding list. If a group cannot be found in that list, larger group will be allocated from the next list. These lists may be sequentially arranged and ordered as needed.

Figure 5:
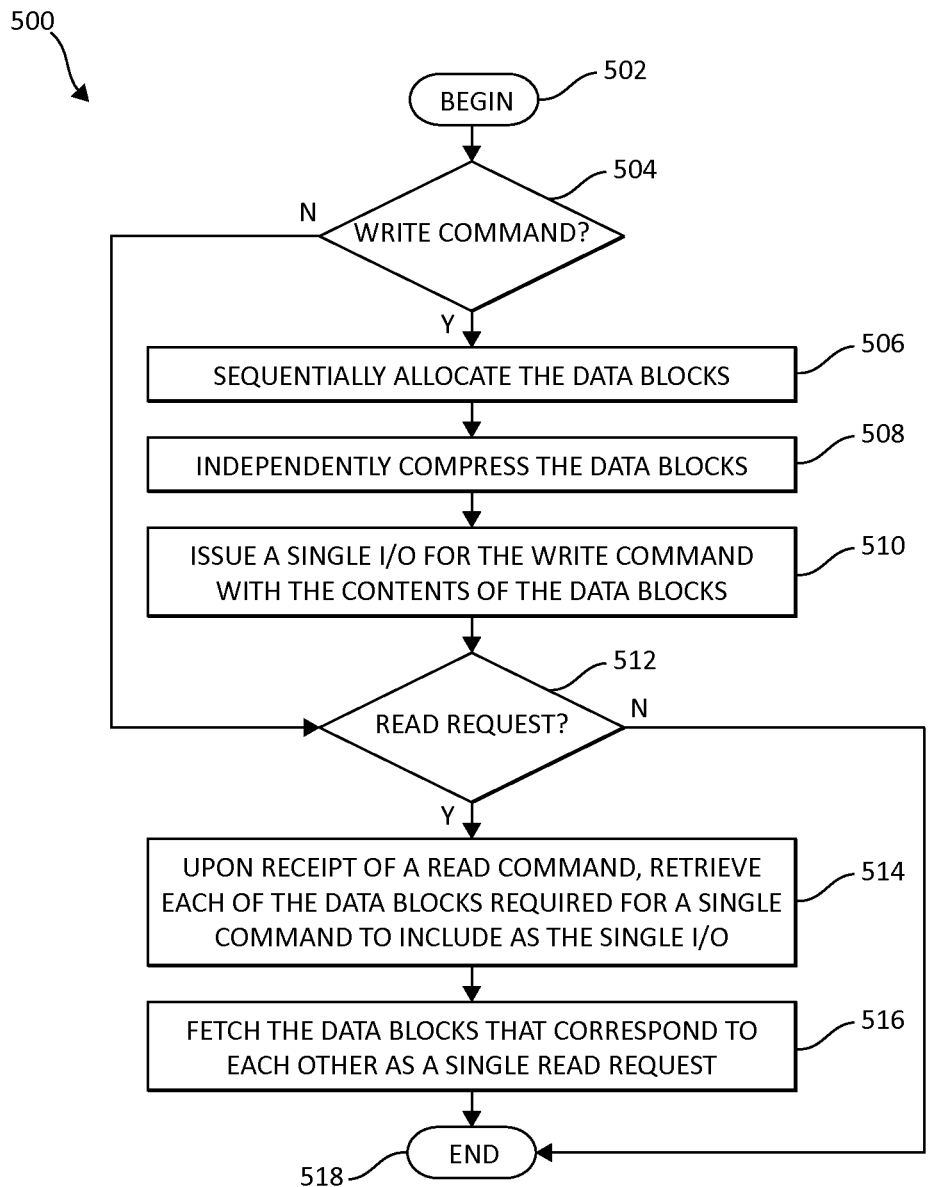
FIG. 5 is a flowchart illustrating an exemplary method for allocating data blocks required for a single command as a single Input/Output (I/O) for write and read commands.

FIG. 5 is a flowchart illustrating an exemplary method 500 for allocating data blocks required for a single command as a single Input/Output (I/O) for write and read commands. The method 500 begins (step 502). The method 500 determines if the command is a write command (step 504). If no, the method 500 will determine if the command is a read command (step 512). If yes, the method 500 may sequentially allocate the data blocks (step 506). The data blocks are independently compressed (step 508). A single I/O for the write command is issued with contents of the data blocks (step 510). If the command is determined to be a read command (step 512), the method 500 may, upon receipt of a read command (e.g., large read commands are used by the user), retrieving each of the data blocks required for a single command to include as the single I/O (step 514). The data blocks that correspond to each other are fetched as a single read request (step 516). The method 500 ends (step 518).

Figure 6:
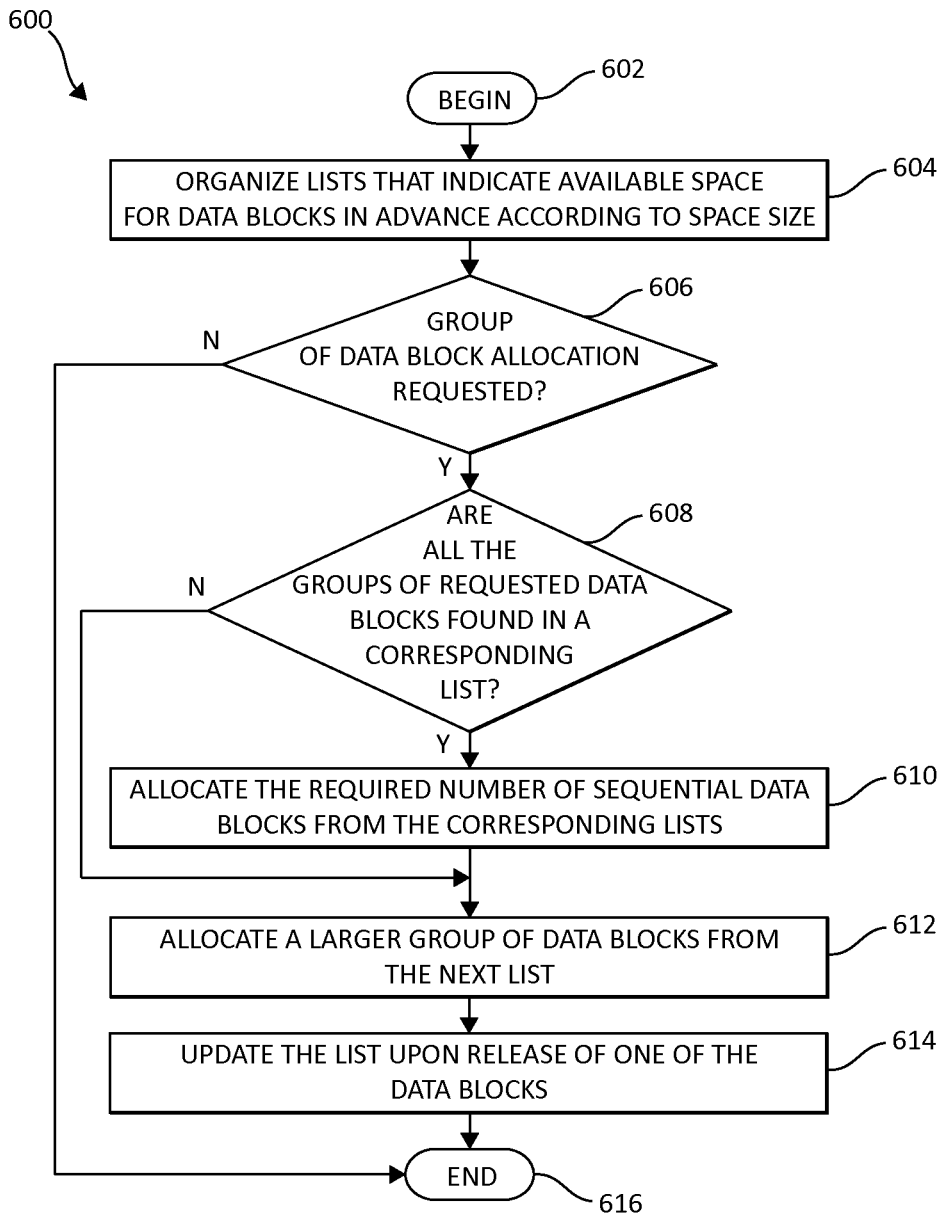
FIG. 6 is a flowchart illustrating an exemplary method for organizing and using lists that indicate the available space of data blocks.

FIG. 6 is a flowchart illustrating an exemplary method 600 for organizing and using lists that indicate the available space of data blocks. The method 600 begins (step 602) with organizing lists that indicate available space (e.g., free space) for data blocks in advance according to space size (step 604). The method 600 may determine if a group of data block allocation is requested (step 606). If no, the method 600 ends. If yes, the method 600 may determine if all the groups of requested data blocks are found in a corresponding list (step 608). If yes, the method 600 may allocate the required number of sequential data blocks from the corresponding lists (step 610). If no, the method 600 may allocate a larger group of data blocks from the next list(s) (step 612). Upon the release of one of the data blocks, the lists are updated (step 614). The method 600 ends (step 616).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagram in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

What is claimed is:

1. A method for compression blocks input/output (I/O) reduction by a processor device in a computing storage environment, the method comprising:
    organizing a plurality of lists, indicating available block space for those of a plurality of compressed data blocks, in advance according to space size;
    arranging the plurality of compressed data blocks into a plurality of groups to provide a single I/O having the contents of the each of the plurality of compressed data blocks included in the single I/O;
    providing a new compression dictionary for each of the plurality of compressed data blocks; and
    sequentially ordering and allocating the plurality of compressed data blocks as the single I/O.

2. The method of claim 1, wherein the plurality of compressed data blocks are independently compressed.

3. The method of claim 1, further including, in conjunction with the allocating, sequentially allocating the plurality of compressed data blocks for a write command, wherein the single I/O for the write command is issued to a storage device with the contents of the plurality of compressed data blocks.

4. The method of claim 1, further including, upon receipt of a read command, retrieving each of the plurality of compressed data blocks required for the single command to include as the single I/O.

5. The method of claim 4, further including, if at least one of the plurality of groups is not found in a corresponding one of the plurality of lists, allocating a larger group from the plurality of groups in a subsequent one of the plurality of lists.

6. The method of claim 1, further including, upon a request for the allocating, allocating a required number of the plurality of sequentially ordered compressed data blocks that are sequential from a corresponding one of the plurality of lists.

7. The method of claim 1, further including, updating the plurality of lists upon release of at least one of the plurality of compressed data blocks.

8. The method of claim 1, further including, reusing the plurality of compressed data blocks to enable the plurality of data blocks to be stored on a plurality of locations on a logical unit.

* * * * *